Patented Nov. 10, 1925.

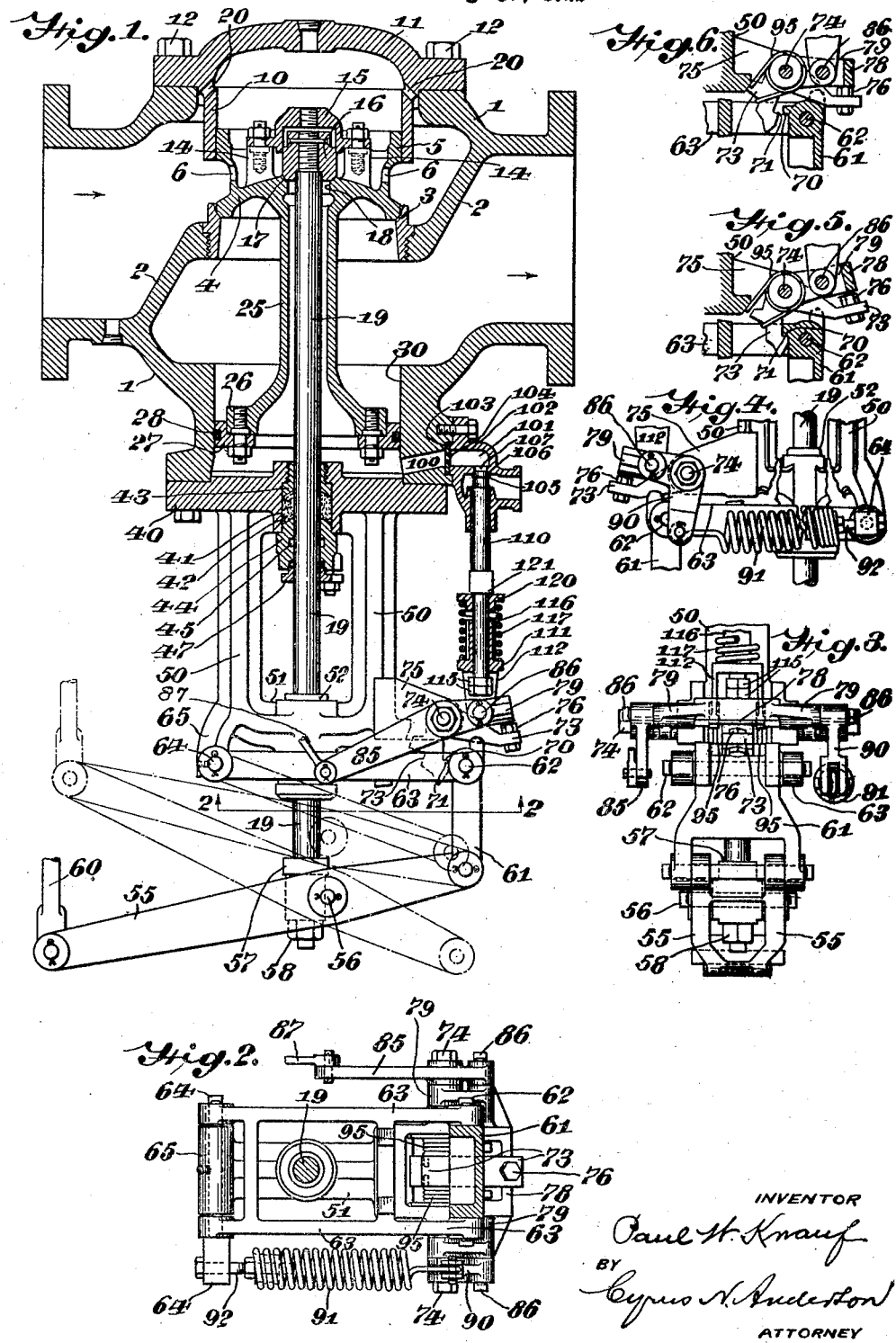

1,560,586

UNITED STATES PATENT OFFICE.

PAUL W. KNAUF, OF CYNWYD, PENNSYLVANIA, ASSIGNOR TO SCHUTTE AND KOERTING COMPANY, OF PHILADELPHIA, PENNSYLVANIA, A CORPORATION OF PENNSYLVANIA.

COMBINED CONTROL AND TRIP VALVE.

Application filed August 17, 1922. Serial No. 582,393.

*To all whom it may concern:*

Be it known that I, PAUL W. KNAUF, a citizen of the United States, and a resident of Cynwyd, in the county of Montgomery and State of Pennsylvania, have invented an Improvement in Combined Control and Trip Valves, of which the following is a specification.

My invention relates broadly to trip valves of the character employed in connection with turbine or other engines and which are adapted to automatically be tripped and to close to shut off the supply of steam or other fluid in the event of accident or other emergency, as in the case of excess speed. In such case the tripping device of the apparatus may be released as a result of the overspeed of the governor.

The general object of the invention is to provide a novel construction of means by the employment of which the least possible resistance, from a practical standpoint, to the manual operation of opening and closing the valve shall be offered, and at the same time to provide for the application of sufficient force to the valve after it has been tripped to insure its closure even though there may be some deposit of scale on the interior working surfaces of the trip valve structure.

A further and more specific object of the invention is to provide a novel construction of means whereby the pressure underneath the valve structure may be released or relieved so that the pressure upon the opposite side thereof may operate to close the valve; and a still further object is to provide means whereby the rate at which such underneath pressure is released may be controlled to thereby control the speed and force of the closing movement of the valve.

Other objects and advantages of the invention will be pointed out in the detailed description thereof which follows or will be apparent from such description.

To the foregoing ends my invention comprehends the novel construction and arrangement of parts as hereinafter fully described and particularly pointed out in the claims and as illustrated in the accompanying drawing in which one form of mechanical embodiment of the invention is depicted. However, it will be understood that the invention is susceptible of embodiment in other forms of construction than that shown and that various changes in the details of construction may be made within the scope of the claims without departing from the said invention.

In the drawings:

Fig. 1 is a view in section and side elevation of a combined control and trip valve construction embodying my invention;

Fig. 2 is a transverse sectional view taken on the line 2—2 of Fig. 1;

Fig. 3 is a side elevational view of a portion of the structure looking toward the left in Fig. 1;

Fig. 4 is a view in side elevation of a portion of the valve operating mechanism taken from the opposite direction from that in which Fig. 1 is taken;

Fig. 5 is a central sectional view of a portion of the trip device showing the trip catch in engagement with a part to be sustained or held thereby; and Fig. 6 is a similar view showing the trip catch out of engagement with such part.

Referring to the drawings: 1 designates a valve casing provided with flanges at its opposite ends to facilitate its connection with the adjacent ends of portions of the pipe line, not shown. The said valve is provided with an angular partition plate 2 having a horizontal portion provided with an opening surrounded by a valve seat 3 upon which a valve 4 is adapted to be seated. The valve 4 is provided with an upwardly extending cylindrical portion 5 having openings 6 therein, as indicated. The upper portion of the part 5 is somewhat thickened and enlarged and fits within a cylinder 10 which depends from the cover plate 11 which is secured by means of bolts 12 to the upper side of the valve casing 1.

The valve 4 is provided with upwardly extending lugs 14 to which a cap 15 is secured by means of which a pilot valve 16 is retained in co-operative relation to a valve seat 17 surrounding an opening 18 through the central portion of the valve 4. The said pilot valve is secured to the upper end of a valve actuating rod 19.

The openings 6 through the cylinder 5 as well as the openings 20 through the cylinder 10 are in communication with the inlet side of the valve casing.

The valve is provided with a depending tubular stem-like portion 25, known as a

"wenig spool", the lower end of which terminates in an enlarged portion 26 to which is secured a ring member 27 having a ring 28 in a groove formed in the outer peripheral surface thereof. The said enlarged end 26 and ring 27 constitute a piston which operates in a cylindrical opening 30 in the lower side of the valve casing 1.

It is apparent that when the valve 4 is in closed position as shown in Fig. 1 the space above the same, which is in communication with the inlet side of the valve casing, will be filled with steam or other operating fluid under pressure. It will also be apparent that when the valve is in open position the steam will not only occupy the space above the valve but will also fill the space below the spool 25 and within the cylinder 30 underneath the piston ring 27. The diameter of the latter, it may be noted, is the same as that of the valve 4.

The lower end of the cylinder 30 is closed by means of the thick plate 40 which is secured to the lower end thereof. The said plate 40 is provided with a central opening as indicated at 41 within which is a suitable packing 42 held in place between glands 43 and 44. The latter is provided with an annular internal slot 45 which is adapted to catch water, which may be condensed from the steam, which is conveyed away by means of a pipe, not shown, having communication therewith. A second gland-like member 47 is provided underneath the gland 44 for aiding in catching the water and retaining the same within the annular slot or chamber 45 from which it is adapted to be drained.

Posts 50 project from the outer surface of the plate 40 and are connected at their outer ends by a cross connecting bar or portion 51. These parts may be referred to generally as constituting a yoke member. The portion 51 is provided with an opening therethrough within which is seated a bushing 52 through which the valve actuating rod 19 extends and which constitutes a support and guide for the latter.

For the purpose of actuating the valve actuating rod for controlling the main valve 4 and the pilot valve 16 a two armed lever 55 is provided which is pivoted intermediate its ends upon the pivot bolt 56 extending through a bearing sleeve upon and extending at right angles to the collar 57 secured upon the lower end of the valve actuating rod 19 by means of a nut 58. The left hand end of the lever 55 is connected with any suitable means (not shown) for actuating the same. The rod 60 is connected with such means. Means for actuating the rod 60 are well known in the art and constitute no part of my invention. If preferred the lever 55 may be manually operated. The right hand end of the lever 55, having reference to Fig. 1, is pivotally connected to the lower end of a link 61 which is pivotally connected at its upper end upon a pivot bolt 62 to the right hand swinging end of a frame-like arm 63 pivoted upon a stationary pivot bolt 64 to the lower end of a projection 65 upon the yoke member previously referred to. The upper end of the link 61 is provided with an inwardly extending projection or shoulder 70 with which the catch shoulder 71 upon the lower outside portion of the depending arm of a bell crank lever 73 is adapted to engage which lever is pivoted upon a bolt 74 which extends through openings and is supported upon the outer end portions of brackets 75 extending laterally and outwardly from the right hand side of the yoke member previously referred to.

The outwardly extending arm of the bell crank lever 73 is provided with a bolt the head 76 of which constitutes a contact member with which the intermediate outwardly projecting portion 78 of a yoke-shaped straddling member 79 is adapted to contact. The contact member 76 may be adjusted as by means of washers placed thereunder if desired. The opposite legs of the straddling member 79 are pivoted upon the pivot bolt 74 previously referred to. The member 79 and the bell crank lever 73 previously referred to are independently pivotally movable.

Pivotal movement of the bell crank lever 73 to effect disengagement of the catch shoulder 71 thereon from the shoulder 70 is effected by pivotal movement of the member 79 toward the right to cause the central portion 78 thereof to contact with the contact member 76. The member 79 normally is held in such position that the central portion 78 does not bear upon the contact member 76 by means of an arm 85 pivotally supported upon one end of the pivot bolt 74. The outer end of said bar 85 projects beyond the pivot bolt 74 and engages one end of the bolt 86 which is carried upon the member 79. The inner end of the arm 85 is connected by means of a rod or bar 87 with means, not shown, which normally holds the same in such position that the part 78 is not allowed to act upon the contact member 76 to cause pivotal movement of the bell crank lever 73. The said means is well known and in general use and may be such as that disclosed in Letters Patent of the United States, No. 1,031,294, and may be released or tripped by the overspeed of the governor or from some other cause. Upon release or tripping of the said means the arm 85 is free to turn upon the pivot rod 74. Such pivotal movement is effected by means of a bell crank lever 90, the depending arm of which has connection with the outer end of a coiled spring 91 the opposite inner end of which is in adjustable engagement with a rod 92 having connection with a squared end of the bolt 64, as shown in Figs. 2 and 4 of the drawing. The other arm of the bell crank lever 90 extends outwardly in parallel relation to one side of the member 79 and is connected to the other end of the bolt 86. Upon release of the lever 85, which may result from the overspeed of a governor as heretofore indicated, the bell crank lever 90 is turned about its pivot in a direction to move the outwardly extending arm thereof downwardly which, by reason of its connection with the bolt 86, causes like pivotal movement of the member 79 the portion 78 of which contacts with the contact member 76 upon the outer arm of the bell crank lever 73 and causes pivotal movement thereof in opposition to the force of springs 95 to cause release of the catch shoulder 71 from the shoulder 70. The springs 95 operate to hold the bell crank lever 73 either in engagement with the shoulder 70 or in position to be engaged by the latter.

Reference has already been made to means for releasing or reducing the steam pressure underneath the valve structure; that is, underneath the piston ring 27 secured to the lower end of the spool 25. This mechanism will now be described.

An opening 100 leads from the lower portion of the cylinder 30 and is in communication with a valve controlled opening 101 through a member 102 detachably connected to the cylinder 30. A washer 103 having a throttle opening 104 therethrough is held between the member 102 and the cylinder 30 and extends across the openings 100 and 101. These washers may be changed as may be desired for the purpose of providing or supplying washers with openings of different sizes to thereby vary the throttling action upon the steam which escapes from the cylinder 30. The passage of the steam from the opening or passageway 101 is controlled by a valve 105 which co-operates with a seat 106 surrounding an opening 107 of reduced area leading from the opening 101. The valve 105 is secured to the upper end of a rod 110 the lower end of which extends through the base 111 of a yoke 112. The connection of the said rod with the base of said yoke is effected by means of nuts 115. A cylindrical sleeve 116 extends upwardly from the base 111 of the said yoke and surrounds the rod 110. A spring 117 is coiled around the said cylindrical sleeve and the lower end thereof rests upon the upper side of the yoke 112 while the upper end thereof presses against the washer 120 the upper side of which bears against a shoulder 121 upon the rod 110. The opposite sides of the yoke 112 are connected to the inner ends of the pins or bolts 86 and 93 upon the opposite side portions of the yoke-shaped straddling member 79.

It will be noted that the upper side of the upper one of the nuts 115 is spaced from the lower side of the base 111 of the yoke 112. The purpose of this is to provide that upon release of the arm 85 the spring 91 acting through the bell crank lever 90 will cause pivotal movement of the straddling member 79 to actuate the bell crank catch lever 73 to release the catch shoulder 71 from the projection or shoulder 70 prior to the time that the rod 110 is moved to open the valve 105. Movement of the rod 110 is effected by contact of the base part 111 of the yoke 112 with the upper one of the nuts 115. It will be apparent that upon the initial downward movement of the yoke 112 and up to the time that the part 111 thereof contacts with the upper one of the nuts 115 the spring 117 which presses at its lower end against the upper side of the base 111 of the yoke and at its upper end against the washer 120 which in turn presses against the shoulder 121 upon the rod 110 will hold the latter upwardly in position to maintain the valve 105 in closed position. Further downward movement of the yoke 112 after contact of the base part 111 thereof with the upper one of the nuts 115 will also cause downward movement of the rod 110 to open the valve 105, but this does not occur until after the catch shoulder 71 has been disengaged from the projection or shoulder 70. This action or operation is desirable because until the valve 105 is open to release the pressure of the steam or other fluid from underneath the valve structure the pressure upon opposite sides thereof are balanced so that disconnection of the catch shoulder 71 from the projection or shoulder 70 may be readily accomplished. But if the valve 105 were opened before such disconnection and the steam pressure underneath the valve structure released the steam pressure upon the opposite side of such structure would press it downwardly with such force as to cause the projection or shoulder 70 to bear upon the shoulder 71 with such pressure as to prevent disengagement thereof under the influence of the spring 91.

It will be seen that by my invention I have provided novel means of simple construction whereby the closing of the valve after it has been tripped or released and the opening of the same thereafter are greatly facilitated and whereby also the closing is efficiently accomplished under all practical conditions.

Having thus described my invention what I claim and desire to secure by Letters Patent is:

1. In a combined control and trip valve structure, the combination of a valve casing, a valve therein, a trip device, means for actuating said trip device for releasing the same, and means having connection with the last mentioned means and actuated thereby for releasing the pressure of steam from underneath the said valve.

2. In a combined control and trip valve structure, the combination of a valve, a casing therefor having an opening leading from the outlet side thereof underneath the said valve, a valve for controlling the passage of steam through said opening, a trip device, and means intermediate the said trip device and the second named valve for operating the latter, said means having connection with said trip device and adapted to be positively actuated thereby.

3. In a combined control and trip valve structure, the combination of a valve casing having a hollow cylinder leading from its outlet side, the outer end of which is closed and also having an opening leading from the lower end portion of said cylinder, a valve provided with a stem-like portion terminating in a piston which is situated and operates within the said cylinder, a valve for opening and closing the said opening, a trip device, and means intermediate the said trip device and the second named valve for actuating the latter after the said trip device has been released, which means has positive connection with both the said trip device and the said second named valve and adapted to be positively actuated by the said trip device.

4. In a combined control and trip valve structure, the combination of a valve casing provided with a hollow cylinder in communication with its outlet side, the outer end of which cylinder is closed and the said cylinder having a passageway leading from the lower end portion thereof, a valve situated within said valve casing and adapted to close the opening therethrough which valve is provided with a hollow stem-like portion the outer end of which terminates in a piston which is situated and operates within the said cylinder, a valve for controlling the passage of steam through said passageway, tripping mechanism comprising a holding catch and means for releasing the said catch, and means intermediate the said tripping mechanism and the second named valve for opening the latter after the release of the said holding catch.

5. In a combined control and trip valve structure, the combination of a valve casing having an opening leading therefrom from the outlet side thereof, a valve structure within said casing from the underneath or outlet side of which steam is adapted to be released through the said opening, a valve for controlling the passage of steam through said opening, tripping mechanism comprising a holding catch and means for releasing the said catch, and connecting means between the last mentioned means and the said valve whereby opening and closing of the latter is effected by movements of the former, the said connecting means comprising means whereby there is lost motion between the said holding catch and tripping means therefor and the said second named valve whereby the said holding catch is released before the said valve is opened.

6. In a combined control and trip valve structure, the combination of a valve casing having an opening leading from the outlet side thereof, a valve structure within said casing for controlling the passage of steam therethrough, the said opening being adapted to permit the escape of steam from the underneath or outlet side of the said valve structure, a valve for controlling the passage of steam through said opening, tripping mechanism, connecting means between the said tripping mechanism and the said second named valve for opening the latter at a predetermined time after the release of the said tripping mechanism, and a throttling device within the said opening for regulating the rate of the discharge of steam therethrough.

7. In a combined control and trip valve structure, the combination of a valve casing having an opening leading from the outlet side thereof, a valve structure within said casing the closure of which is adapted to be controlled by the release of steam through said opening, a valve for controlling the said opening, tripping mechanism and a connection between the said tripping mechanism and the said second named valve, the said connection comprising a member having connection with a part of the said tripping mechanism, and a member having connection with the said valve the said members being slidably connected and being normally so related that the first of the said members may be moved through a predetermined distance before movement of the second named member is effected.

8. In a combined control and trip valve structure, the combination of a valve casing having a hollow cylinder closed at its outer end in communication therewith from which cylinder an opening leads to the atmosphere, a valve within said casing for controlling the passage of steam therethrough, said valve being provided with a hollow stem portion which terminates in a piston which is situated and operates within the said cylinder the diameter of which is of the same diameter as that of the valve whereby steam pressures upon opposite sides of the valve structure are balanced, a valve for closing the said opening which valve normally is in closed position, tripping mechanism comprising a holding catch lever and means for actuating said lever to release the same from its holding position, and means for connecting the said holding catch actuating means with the said second named valve, the said connecting means comprising a member secured to the said holding catch actuating means and a member having connection with the said second named valve, the said members being slidably connected and so related that the first of the said members is adapted to move through a predetermined distance before actuation of the second of said members is effected to open the said second named valve.

9. In a combined control and trip valve structure, the combination of a valve casing provided with a hollow cylinder leading from the outlet side thereof the outer end of which is closed and from the outer end portion of which cylinder an opening leads to the atmosphere, a valve within said casing for controlling the passage of steam therethrough, which valve is provided with a hollow stem which terminates in a piston head which is situated and operates within the said cylinder, a valve for closing the said opening which valve normally is in closed position, tripping mechanism comprising a holding catch lever for retaining the first named valve in open position, means for actuating the said holding catch lever for releasing the same and a connection between the said holding catch actuating means and the second named valve for opening the same, the said connection comprising a member having pivotal connection with the said holding catch mechanism, a member having limited slidable engagement with the first named member, and yielding means between the said members for holding the second named member in closed position during the first part of the movement of the holding catch actuating means and the said member secured thereto.

10. In a combined control and trip valve structure, the combination of a valve casing having a hollow cylinder leading from the outlet side thereof the outer end of which is closed and from the lower end portion of which cylinder an opening leads to the atmosphere, a valve within said casing for controlling the passage of steam therethrough which valve is provided with a hollow stem which terminates in a piston head which is situated and operates within the said cylinder and which stem is provided with openings through which steam is adapted to pass to the underneath side of the said piston within said cylinder, a valve rod extending through the said hollow stem to the exterior of the valve casing, valve actuating levers having connection with the outer end of the said rod, tripping mechanism comprising a holding catch lever which is adapted to engage said levers for holding the same with the valve in open position and means for tripping the said holding catch, a valve for controlling the passage of steam through the said opening, and connecting means between the said holding catch actuating means and the said second named valve which connecting means, after the said holding catch actuating means is moved through a predetermined distance, is adapted to be actuated to open the said second named valve to release the steam pressure from underneath the said piston.

11. In a combined control and trip valve structure, the combination of a valve casing having a hollow cylinder leading from the outlet side thereof the outer end of which is closed and from the lower end portion of which cylinder an opening leads to the atmosphere, a valve within said casing for controlling the passage of steam therethrough which valve is provided with a hollow stem which terminates in a piston head which is situated and operates within the said cylinder and which stem is provided with openings through which steam is adapted to pass to the underneath side of the said piston within said cylinder, a valve rod extending through the said hollow stem to the exterior of the valve casing, valve actuating levers having connection with the outer end of the said rod, tripping mechanism comprising a holding catch lever which is adapted to engage said levers for holding the same with the valve in open position and means for tripping the said holding catch, a valve for controlling the passage of steam through the said opening, connecting means between the said holding catch actuating means and the said second named valve which connecting means, after the said holding catch actuating means is moved through a predetermined distance, is adapted to be actuated to open the said second named valve to release the steam pressure from underneath the said piston, and a throttling device within said opening.

In testimony that I claim the foregoing as my invention I have hereunto signed my name this 14th day of August, 1922.

PAUL W. KNAUF.